United States Patent [19]

Gajjar et al.

[11] Patent Number: 5,146,574

[45] Date of Patent: Sep. 8, 1992

[54] METHOD AND CIRCUIT FOR PROGRAMMABLE SELECTING A VARIABLE SEQUENCE OF ELEMENT USING WRITE-BACK

[75] Inventors: Kumar Gajjar, San Jose; Anh Nguyen, Sunnyvale, both of Calif.

[73] Assignee: SF2 Corporation, Sunnyvale, Calif.

[21] Appl. No.: 372,278

[22] Filed: Jun. 27, 1989

[51] Int. Cl.[5] .................. G06F 3/06; G06F 13/12
[52] U.S. Cl. .................. 395/425; 364/DIG. 1; 364/240; 364/246.4; 364/262.4; 364/248.1; 364/259; 364/238.4; 360/47
[58] Field of Search ... 364/200 MS File, 900 MS File; 360/47

[56] References Cited

U.S. PATENT DOCUMENTS

| | | | |
|---|---|---|---|
| 3,303,482 | 2/1967 | Jenkins | 360/47 |
| 3,544,777 | 12/1970 | Winkler | 235/153 |
| 3,693,159 | 9/1972 | Hilberg | 364/900 |
| 3,772,652 | 11/1973 | Hilberg | 364/900 |
| 3,803,560 | 4/1974 | DeVoy et al. | 364/200 |
| 3,905,023 | 9/1975 | Perpiglia | 364/200 |
| 3,917,933 | 11/1975 | Scheuneman et al. | 235/153 K |
| 4,093,985 | 6/1978 | Das | 364/200 |
| 4,236,207 | 11/1980 | Rado et al. | 364/200 |
| 4,339,804 | 7/1982 | Davison et al. | 364/900 |
| 4,464,747 | 8/1984 | Groudan et al. | 371/50 |
| 4,467,421 | 8/1984 | White | 364/200 |
| 4,468,731 | 8/1984 | Johnson et al. | 364/200 |
| 4,507,730 | 3/1985 | Johnson et al. | 364/200 |
| 4,652,993 | 3/1987 | Scheuneman et al. | 364/200 |
| 4,667,326 | 5/1987 | Young et al. | 371/40 |
| 4,672,535 | 6/1987 | Katzman et al. | 364/200 |
| 4,680,730 | 7/1987 | Omoda et al. | 364/200 |
| 4,722,085 | 1/1988 | Flora et al. | 371/38 |
| 4,761,785 | 8/1988 | Clark et al. | 371/51 |
| 4,768,193 | 8/1988 | Takemae | 371/10 |
| 4,817,035 | 3/1989 | Timsit | 364/900 |
| 4,825,403 | 4/1989 | Gershenson et al. | 364/900 |
| 4,849,929 | 7/1989 | Timsit | 364/900 |
| 4,887,211 | 12/1989 | Thiel et al. | 364/413.13 |
| 4,914,656 | 4/1990 | Dunphy, Jr. et al. | 371/10.2 |
| 4,920,477 | 4/1990 | Colwell et al. | 364/200 |
| 4,933,846 | 6/1990 | Humphrey et al. | 364/200 |

FOREIGN PATENT DOCUMENTS

| | | |
|---|---|---|
| 0266789 | 6/1987 | European Pat. Off. . |
| 369707 | 11/1989 | European Pat. Off. . |
| 56-88549 | 7/1981 | Japan . |
| 56-94593 | 7/1981 | Japan . |
| 56-163596 | 12/1981 | Japan . |
| 56-169297 | 12/1981 | Japan . |
| 57-111890 | 7/1982 | Japan . |
| 57-111893 | 7/1982 | Japan . |
| 57-195397 | 12/1982 | Japan . |
| 58-83400 | 5/1983 | Japan . |
| 60-156152 | 8/1985 | Japan . |
| 61-99999 | 5/1986 | Japan . |

OTHER PUBLICATIONS

D. Patterson et al., "A Case For Redundant Arrays of Inexpensive Disks (RAID)," Report No. UCB/CSD 87/391, Dec. 1987.

D. Patterson et al., "A Case for Redundant Arrays of Inexpensive Disks (RAID)," ACM SIGMOD Conference, Chicago, Ill., Jun. 1–3, 1988.

Product Description, Micropolis 1804 SCSI Parallel Drive Array, Document No. 108120 Rev A.

Program Summary, DataStorage86, An International Forum, Sep. 22–24, 1986, Red Lion Inn, San Jose, Calif.

H. Sierra, "Assessing the promise of disk arrays," Canadian Datasystems, May 1989, pp. 52–53.

D. Simpson, "RAIDs vs. SLEDs." Systems Integration, Nov. 1989, pp. 70–82.

(List continued on next page.)

OTHER PUBLICATIONS

Mike Sisley, "Microprogram Development Technique Adds Flexibility," New Electronics, vol. 17, No. 23, Nov. 27, 1984, pp. 35-38.

J. Voelker, "Winchester disks reach for a gigabyte," IEEE Spectrum, Feb. 1987, pp. 64-67.

D. Lieberman, "SCSI-2 Controller Board Builds Parallel Disk Drive Arrays," Computer Design, vol. 28, No. 7, Apr. 1, 1989, pp. 32, 36.

W. Meador, "Disk Array Systems," Spring COMPCON 89 Digest of Papers, IEEE Computer Society Press, pp. 143-146.

T. Olson, "Disk Array Performance In A Random IO Environment," Computer Architecture, vol. 17, No. 5, Sep. 1989, pp. 71-77.

W. Jilke, "Disk Array Mass Storage Systems: The New Opportunity," Amperif Corporation, Sep. 30, 1986.

W. Jilke, "Economics Study of Disk Array Mass Storage Systems: The Cost Reduction Opportunity," Amperif Corporation, Mar. 24, 1987.

Michelle Y. Kim, "Synchronized Disk Interleaving," IEEE Transactions On Computers, vol. C-35 No. 11, Nov. 1986.

*Primary Examiner*—Thomas C. Lee
*Assistant Examiner*—Mehmet Geckil
*Attorney, Agent, or Firm*—Mark D. Rowland

[57] ABSTRACT

A programmable element sequence selection circuit which selects a repeatable sequence of elements from a plurality of elements is provided. The sequence selection circuit includes a sequence storage circuit into which a sequence of element identifiers is loaded and accessed.

18 Claims, 6 Drawing Sheets

METHOD AND CIRCUIT FOR PROGRAMMABLE SELECTING A VARIABLE SEQUENCE OF ELEMENT USING WRITE-BACK

BACKGROUND OF THE INVENTION

The present invention relates generally to a circuit for selecting a sequence of elements. More particularly, the present invention relates to a programmable circuit for selecting a repeatable sequence of elements at a high speed.

In a data processing system the performance of the central processing units (CPUs) is often limited by their data-storage subsystems. In particular, secondary storage devices used in such subsystems often are incapable of transferring data at a rate that matches the speed with which the CPUs and the system busses are capable of handling the data. To improve the data transfer rate of the data-storage subsystems, and to enhance the overall data throughput of data processing systems, a storage subsystem architecture can be used in which the data is stored in an array of multiple storage devices.

Such a storage array architecture can be implemented by coupling a high-speed data path (e.g., an input/output bus of a CPU) to an array of slower storage devices (e.g., tape or disk drives) via a corresponding array of high-speed memory elements. To write data to the storage devices, the data is divided into segments, and the segments are transferred at high speed one after another over the data path to different ones of the memory elements of the memory element array, which in turn hold the data segments until the corresponding storage devices are ready to receive the data. The segments of data can then be transferred in parallel to the storage devices, such that the entire data may be stored in the storage device array in a shorter time, and with less sacrifice of CPU and system bus cycles, than would be required by a single storage device. The throughput of the high-speed data path is thus enhanced. The stored data can likewise be read from the storage devices at a high speed by transferring segments of data to corresponding memory elements, which in turn transfer one segment after another over the high-speed data path at a rapid rate.

Generally, the known method for directing data into and out of a series of memory elements is to use a state machine sequencer implemented in hardware logic to control a memory element access sequence. This method has several drawbacks. For example, the configuration in which data segments are stored in an array may vary from data transfer to data transfer, thus making it necessary that the sequence in which the data segments are transferred between the data path interface and the storage device array be variable. A state machine sequencer typically lacks sufficient flexibility to accommodate many different data storage configurations, and may require expensive modification to accommodate even a slight change in configuration. This may limit the usefulness of the entire secondary storage subsystem. Known state machine sequencers also are typically complex and expensive. Thus there is a need for a process for selecting memory elements that can be varied to accommodate a wide variety of data storage configurations and that can be implemented in a simple and inexpensive manner.

SUMMARY OF THE INVENTION

The programmable element sequence selection circuit of the present invention provides a simple and inexpensive means for selecting elements such as high-speed memories from a plurality of such elements in a repeatable sequence. The circuit can be used in a wide variety of applications, including data processing, vector processing and other computer-controlled functions.

The sequence selection circuit is programmable by control signals from a conventional microprocessor. The microprocessor may provide reset control signals to place the sequence storage circuit in an initialized state. In the preferred embodiment a microprocessor programs the circuit with a sequence of memory element identifiers corresponding to a defined storage configuration (e.g., a desired arrangement of data segments on a plurality of storage devices). The particular sequence, or a repeating portion thereof is loaded by the microprocessor into a sequence storage circuit, which is preferably implemented using conventional FIFO circuitry.

The output of the sequence storage circuit is coupled to a write-back circuit to allow the memory element sequence to be recycled in the sequence storage circuit as memory elements in the sequence are selected. The microprocessor is also coupled to a holding register circuit to store a count to be loaded into a transfer counter. The count is a measure of the amount of data to be transferred to or from each memory element. The transfer counter is a down counter, which may, for example, be decremented once for each word of data transferred. When the transfer counter decrements to zero, it causes the sequence storage circuit to select the next memory element(s) in the sequence, after which the transfer counter is reloaded from the holding register circuit.

The element identifiers stored in the sequence storage circuit may include one or more parity bits, and the sequence storage circuit may also includes a parity checker for ensuring that correct information is written back into the sequence storage circuit by the write-back circuit. The sequence selection circuit may also include a read-back circuit to allow the microprocessor to read the sequence storage circuit and the holding register circuit for validation or diagnostic purposes.

BRIEF DESCRIPTION OF THE DRAWINGS

The above and other advantages of the present invention will be apparent upon consideration of the following detailed description, taken in conjunction with the accompanying drawings, in which.

DETAILED DESCRIPTION OF THE INVENTION

Figure 1:
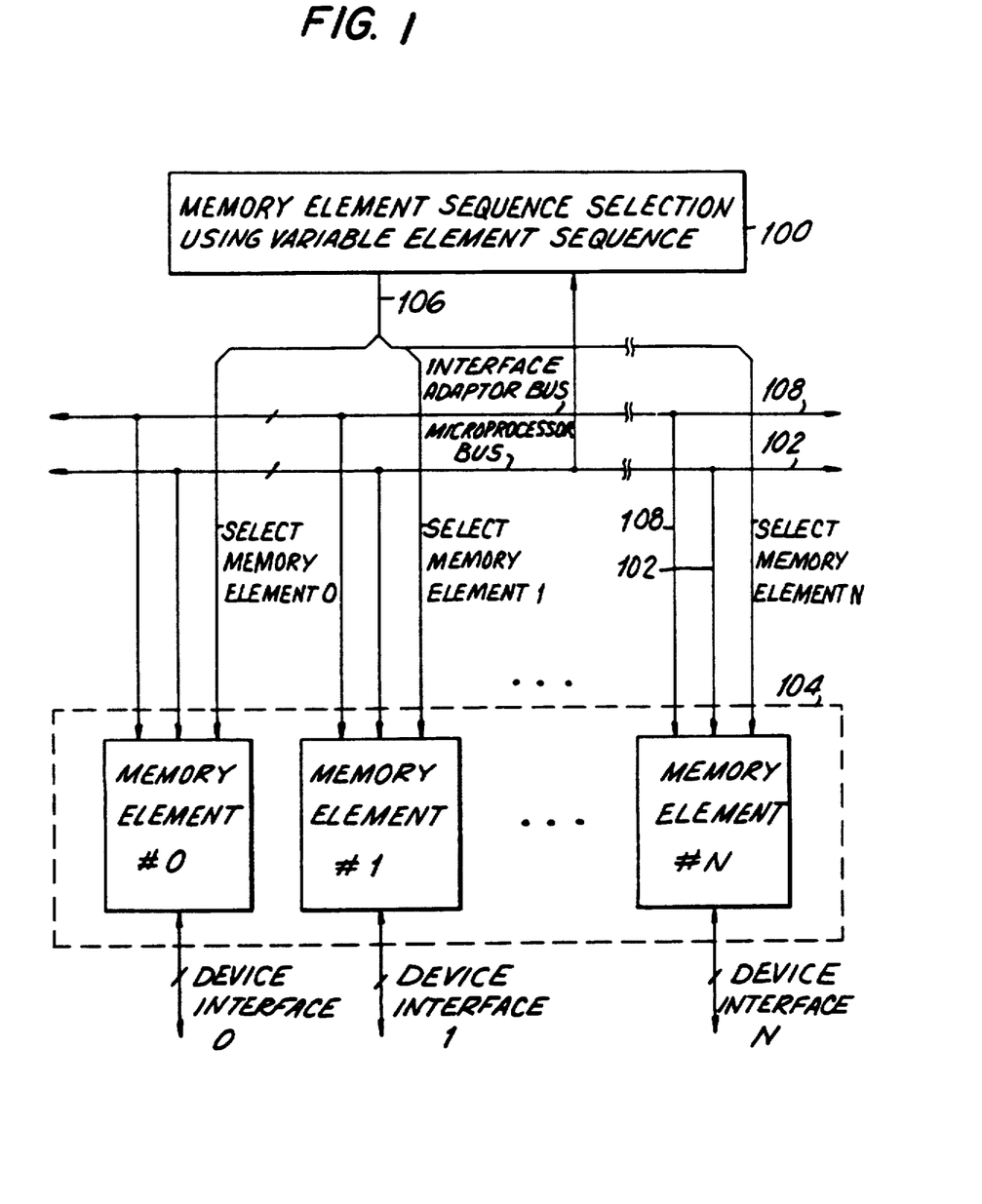
FIG. 1 is a block diagram of an array of memory elements coupled in an exemplary manner to the programmable element sequence selection circuit of the present invention.

A block diagram of the programmable sequence selection circuit 100 of the present invention, as applied to select a sequence of memory elements from a plurality of memory elements #0-#N for transferring data between an interface adaptor bus 108 and the selected memory elements, is shown in FIG. 1. The programmable sequence selection circuit 100 is coupled to a conventional microprocessor bus 102. The characteristics of bus 102 (e.g., number of lines) will typically depend on the microprocessor (not shown in FIG. 1) controlling the circuit. The microprocessor may be of any conventional general purpose type. It may also be a more specialized microprocessor, such as a vector processor or a RISC processor, depending on the particular application. Although the preferred embodiment of the present invention is directed to an implementation of the sequence selection circuit in a high-speed data storage application, it is to be understood that the circuit and method of the present invention are not so limited, and can be applied generally to various types of processor-controlled circuitry in which there is a need for the processor to select a sequence of elements, including circuitry such as might be used in automated machinery.

The microprocessor programs sequence selection circuit 100 via microprocessor bus 102. In the implementation of FIG. 1, microprocessor bus 102 is also used to load control information into an array 104 of memory elements #0 through #N. Microprocessor bus 102 also permits the microprocessor to transfer data directly into and out of the memory elements. Memory elements #0-#N can be implemented with conventional memory circuits. Each memory element includes an interface to microprocessor bus 102 which couples the bus to an address pointer and other control registers in the memory element, and to a data port of the memory element. The microprocessor provides various control signals to each memory element, which may include signals for loading the address pointer, enabling a read or write operation, initializing the memory, and for diagnostic testing.

Each memory element of array 104 is coupled to programmable sequence selection circuit 100 by a separate line of select memory element bus 106. Bus 106 transmits control signals ("select memory element #") from sequence selection circuit 100 to select particular memory elements from array 104. For example, when a "select memory element #0" signal is asserted by sequence selection circuit 100, memory element #0 is selected to perform a data transfer between interface adaptor bus 108 and device interface 0 coupled to memory element 0. Interface adaptor bus 108 couples the memory elements of array 104 to a bus of the data processing system, such as a high-speed input/output bus, and is used to transfer data between the memory elements of array 104 and the data processing system. Interface adaptor bus 108 can be implemented using any conventional protocol such as SCSI, SMD or IPI. The device interfaces O-N couple the memory elements to corresponding secondary storage devices such as a disk or tape drive, or to some other type of peripheral such as a keyboard or printer terminal. As with interface adaptor 108 bus, any conventional device interface can be used.

In accordance with the protocol of interface adaptor bus 108, data to be transferred to the storage devices or peripherals is first divided by interface adaptor bus 108 into segments. The segments are transferred by interface adaptor bus 108 one after another to memory elements of array 104 in a sequence selected by sequence selection circuit 100. The segments are then transferred from the memory elements to the corresponding device interfaces when the device interfaces are ready. The device interfaces may receive the segments at different times or in parallel Meanwhile microprocessor bus 102 and interface adaptor bus 108 may perform other functions. Likewise, when a request to retrieve data from the storage devices or peripherals is asserted, data is transferred in individual segments from the storage devices or peripherals to the corresponding memory elements via the device interfaces. The segments are then transferred to interface adaptor bus 108 one after another in a sequence selected by sequence selection circuit 100.

Figure 2:
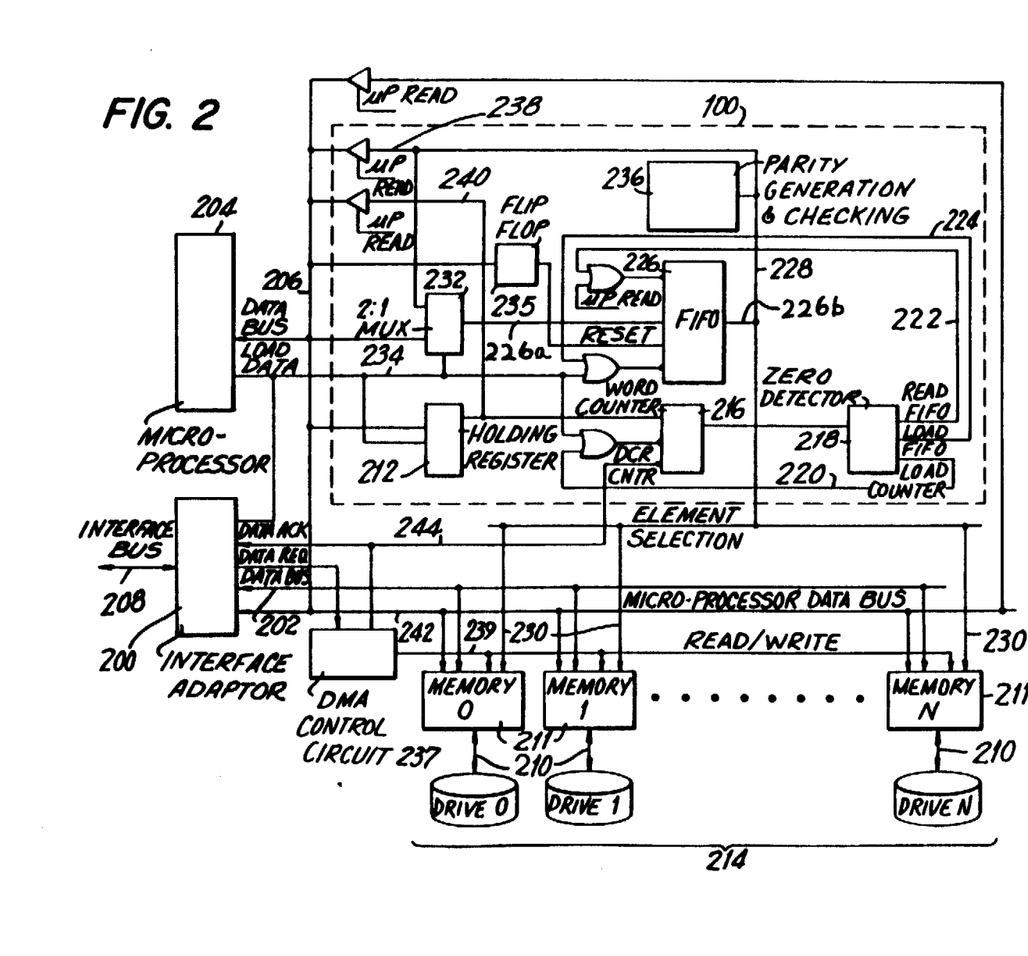
FIG. 2 is a block diagram of a preferred implementation of the programmable element sequence selection circuit of the present invention in a secondary storage subsystem.

FIG. 2 shows a preferred implementation of the programmable element sequence selection circuit 100 of FIG. 1 in a secondary storage subsystem (i.e., a system including a plurality of secondary storage devices and associated device controller and interface circuitry). The portion of the secondary storage subsystem shown in FIG. 2 illustrates various paths along which data can be transferred in the secondary storage subsystem to and from a plurality of disk drive devices (O-N). Data is transferred between interface adaptor circuit 200 and the memory elements 211 over data bus 202, although data can also be transferred between microprocessor 204 and memory elements 211 over microprocessor data bus 206, or from one memory element to another over bus 202 or 206 or another bus not shown.

Interface adaptor circuit 200 is typically coupled to an external interface bus 208 by which data is transferred between adaptor circuit 200 and other modules of the secondary storage subsystem or other components of the data processing system. Interface bus 208 may, for example, be a high-speed parallel bus coupling interface adaptor circuit 200 to a front-end interface module of the secondary storage subsystem. Interface adaptor circuit 200 controls the flow of data on data bus 202 which couples interface adaptor circuit 200 to a data port of each of memory elements O-N. Each memory element in turn is coupled to a corresponding disk drive via a drive interface bus 210. The transfer of data between the memory elements and the drives over interface drive busses 210 is controlled by microprocessor 204 and other control circuitry not forming a part of sequence selection circuit 100 of the present invention.

Microprocessor 204 also controls the overall process by which data is transferred between interface adaptor circuit 200 and memory elements O-N. The data is transferred as a series of data segments, typically of equal length. The size of the segments is defined by microprocessor 204 and may, for example, equal the size of a sector on each of the disk drives O-N. Each segment is transferred between interface adaptor circuit 200 and a memory element as a unit.

Microprocessor data bus 206 couples the microprocessor to control registers in interface adaptor circuit 200, including a transfer length counter and a read/write register. Microprocessor data bus 206 also couples the microprocessor to address registers in memory elements O-N and a holding register circuit 212 in sequence selection circuit 100. Holding register circuit 212 is used to store a value equal to the number of data words or bytes in each segment of data to be transferred between interface adaptor 200 and a memory element.

A transfer (or word) counter circuit 216 is coupled to the output of holding register circuit 212. Transfer counter 216 is a down counter and is loaded with the word count stored in holding register circuit 212 each time a new data segment is to be transferred to or from a memory element. Transfer counter 216 is decremented once for each data word or byte transferred. When transfer counter 216 reaches 0, a signal is sent to zero detector circuit 218 indicating completion of a segment transfer, and transfer counter 216 is reloaded by holding register 212 in response to a signal from zero detector circuit 218 on line 220. The segment transfer completion signal also causes zero detector circuit 218 to provide read and load signals on lines 222 and 224 respectively to sequence storage circuit 226.

Sequence storage circuit 226 is a programmable circuit for storing a sequence of memory element identifiers used to select the memory elements to or from which data is to be transferred. The output of sequence storage circuit is coupled to element selection bus 228, lines of which are coupled individually to select lines 230 of memory elements O-N. Preferably, sequence storage circuit 226 is implemented using conventional FIFO circuits to form a storage matrix in which memory element identifiers stored in the circuit are accessed in the same sequence that they are loaded, although the access sequence may also be in any other repetitive order depending on the implementation and the application (e.g., the identifiers can be accessed in a reverse order). Sequence storage circuit 226 can also be implemented using RAM or register arrays, or a microprocessor, but a FIFO implementation requires the least amount of hardware.

Figure 3:
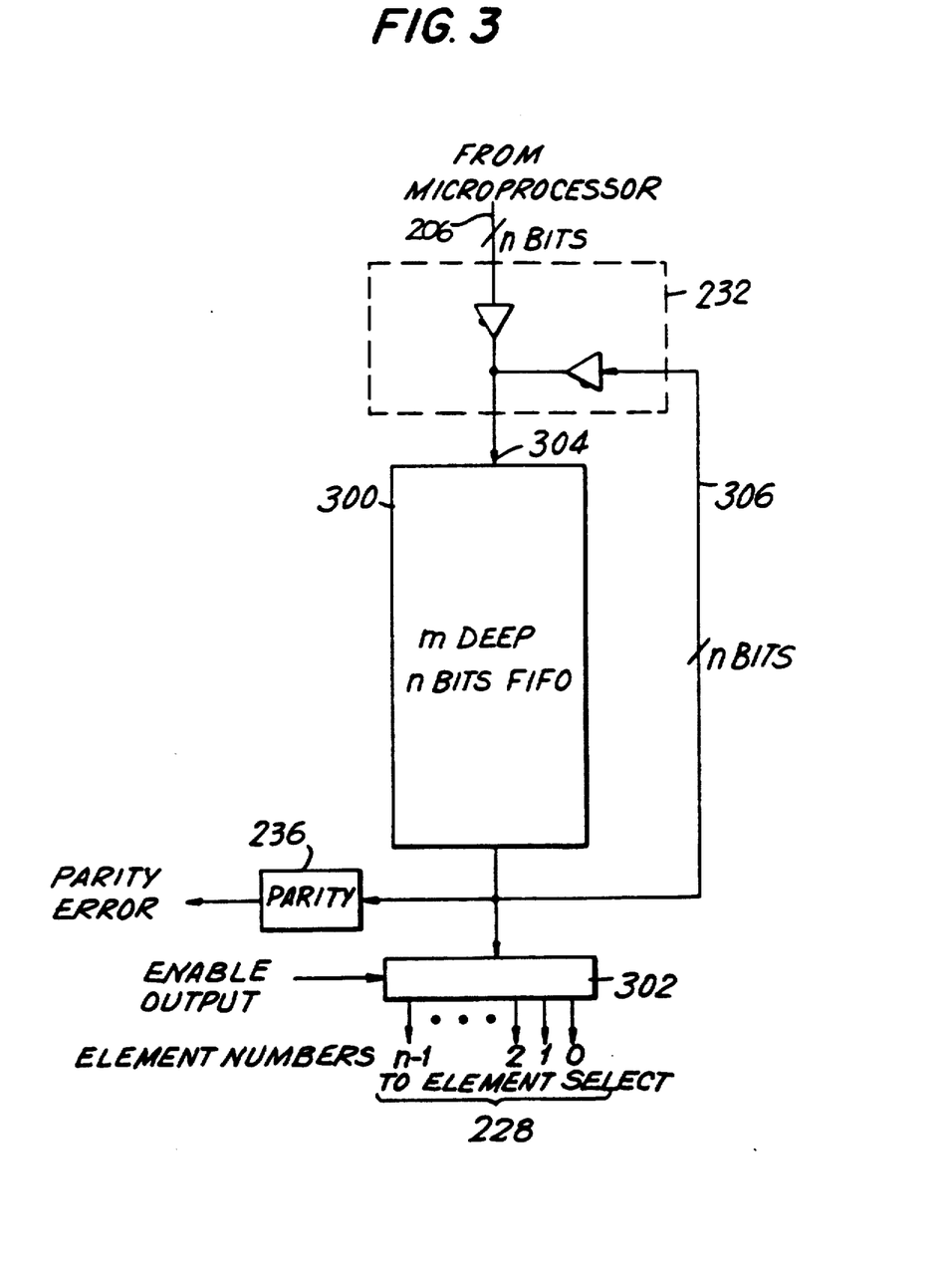
FIG. 3 is a block diagram of an exemplary bit-significant implementation of the sequence storage circuit of the present invention.

The exact manner in which element identifiers are accessed from sequence storage circuit 226 depends on the particular implementation of the circuit. Accessing an element identifier from sequence storage circuit 226 can be accomplished in numerous ways. For example, it may be the case that a FIFO circuit is used that automatically transfers the first identifier with which it is loaded to its output and latches the output, such that the first identifier is immediately available on element selection bus 228, and subsequently loaded identifiers are accessed by providing a read signal to the FIFO circuit. This implementation is exemplified in FIG. 2. The FIFO circuit may also require an additional output enable signal, as shown in FIG. 3. "Accessing" sequence storage circuit implementations other than FIFO circuitry may include operations such as "fetch", "unload" and "non-destructive read".

The output of sequence storage circuit 226 is also coupled by bus 228 to one input of a 2:1 multiplexer circuit 232, the other input of which is coupled to microprocessor data bus 206. At the beginning of a data transfer, microprocessor 204 provides a signal on load data line 234 which causes multiplexer circuit 232 to couple data bus 206 to the data input 226a of sequence storage circuit 226 in order to load memory element identifiers into sequence storage circuit 226. After the identifiers are loaded microprocessor 204 releases control of multiplexer 232, and multiplexer circuit 232 couples the output 226b of sequence storage circuit 226 to its input 226a. Multiplexer circuit 232 allows the output 226b of sequence storage circuit 226 to be written back to its input 226a each time an identifier stored in sequence storage circuit 226 is accessed. In this manner the sequence of memory element identifiers stored in sequence storage circuit 226 can be repeated as necessary to complete the transfer of data. When the transfer is completed, or at the initiation of a subsequent transfer, the microprocessor causes a reset control logic circuit 235 to clear sequence storage circuit 226.

A parity circuit (or other validation circuitry) 236 coupled to bus 228 validates the identifiers written back into sequence storage circuit 226. Each identifier stored by microprocessor 204 in sequence storage circuit 226 includes one or more parity bits. When an identifier is accessed from sequence storage circuit 226, parity circuit 236 generates a corresponding parity value and compares it to the parity bit or bits appended to the identifier. Parity circuit 236 generates an error signal if the compared parity data do not match. In addition, bus 238 is coupled between the output of sequence storage circuit 226 and microprocessor data bus 206 to allow microprocessor 204 to read back identifiers stored in sequence storage circuit 226 for validation and diagnostic purposes. Bus 240 couples the output of holding register circuit 212 to microprocessor data bus 206 to allow microprocessor 204 to read the contents of holding register circuit 212 for similar purposes.

An exemplary implementation of sequence storage circuit 226 using an n x m FIFO circuit 300 is shown in FIG. 3, where n represents the bit length of the storage matrix (i.e., the number of bits in each memory element identifier storage location), and m represents the depth of the storage matrix (i.e., the number of identifier storage locations). FIFO circuit 300 can be constructed from any number of conventional FIFO circuit chips to create a matrix of the desired size. If it is desired that a group of memory elements from an array of memory elements be selectable at one time during a sequenced data transfer, the FIFO circuit can be implemented in a bit-significant format where each bit of an identifier storage location in the FIFO circuit corresponds to a different memory element. In this format the identifiers stored in the FIFO circuit directly represent, as a pattern of ones and zeros, the selection signals for each element of the array, and the bit-length of the FIFO circuit at least equals the number of memory elements in the memory element array. The bit-length may be greater than the array size if parity bits are appended to the stored identifiers. This format (without parity bits) is shown in FIG. 5.

If on the other hand only a single memory element is to be selected during each step of the sequenced data transfer, the bit-length of the FIFO circuit can be made less than the size of the memory element array by encoding the memory element identifiers stored in the FIFO, and decoding the identifiers into bit-significant patterns as the identifiers are read from the FIFO circuit. This storage format is shown in FIG. 4.

Returning to FIG. 3, FIFO circuit 300 receives a sequence of memory element identifiers from microprocessor data bus 206 through multiplexer 232. The output of FIFO circuit 300 is coupled through an enabled output circuit 302 to element selection bus 228 and is written back to the input 304 of FIFO circuit 300 by bus 306 to permit the accessed identifier of the sequence to be repeated. Parity checker circuit 236 generates a parity error signal if the parity does not match the parity of the stored identifier.

Figure 6:
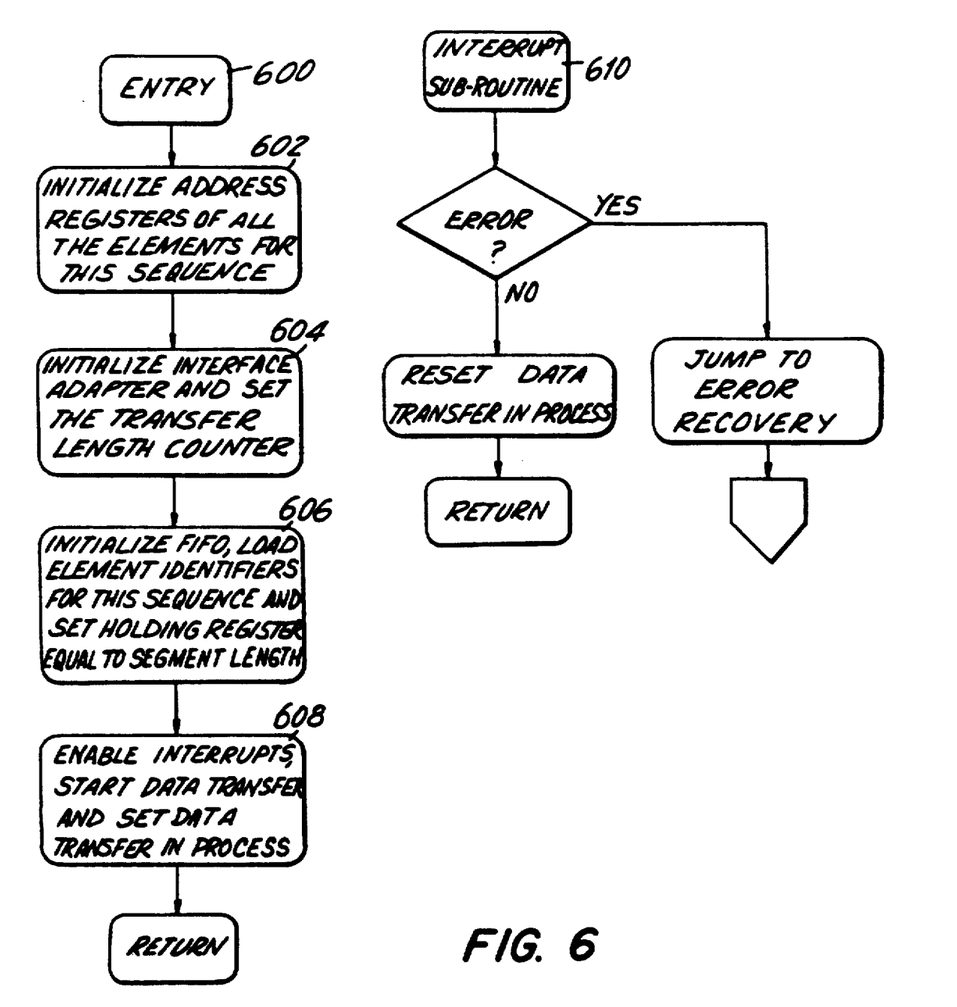
FIG. 6 is a flow chart illustrating the steps of a microprocessor subroutine for implementing the programmable sequence selection process of the present invention.

When a data transfer between interface adaptor 200 and storage array 214 formed by drives O-N is to take place, microprocessor 204 jumps to an initialization subroutine such as that shown by flow chart 600 in FIG. 6 to program sequence selection circuit 100 and to initiate the data transfer. Referring to FIG. 6, microprocessor 204 first initializes various circuits involved in the data transfer as shown in steps 602, 604 and 606 of subroutine 600. These steps can be executed in any order.

In step 602 microprocessor 204 initializes the address registers of memory elements to be selected during the transfer. In step 604, microprocessor 204 initializes interface adaptor 200 by loading the size of the data to be transferred into a transfer length counter in the interface adaptor and by indicating to the interface adaptor the direction of the transfer (e.g., memory element to interface adaptor or vice versa). Microprocessor 204 then in step 606 initializes the sequence storage circuit 226 using flip flop 235 and loads a sequence of element identifiers into sequence storage circuit 226. Holding register circuit 212 is loaded with a value equal to the number of words to be transferred in each segment of data to an individual memory element. In step 608 microprocessor 204 next enables system interrupts such as those indicating an error and a transfer counter interrupt. Microprocessor 204 then sends a command to interface adaptor 200 to assert a data request signal on line 242, and microprocessor 204 returns from subroutine 600. A flow chart of a typical interrupt subroutine 610 is also shown in FIG. 6.

Data transfers over bus 202 between interface adaptor 200 and memory elements O-N generally take place as follows. Data is transferred over bus 202 one word at a time. To write data to a selected memory element, interface adaptor 200 places a data word on bus 202 and asserts a data request signal on data request line 242, which provides the data request signal to direct memory access (DMA) control circuit 237. DMA control circuit 237 generates a write pulse on line 239, which in combination with the memory element select signal allows a data word to be written to the memory element or elements selected by sequence selection circuit 100. DMA control circuit 237 asserts a data acknowledge signal on line 244. This data acknowledge signal informs interface adaptor 200 to assert another data request signal for the next word to be transferred. The data acknowledge signal also is coupled to word counter circuit 216, which decrements its value once for every data acknowledge signal it receives.

To conduct a data read (i.e., a transfer of data from memory elements O-N to interface adaptor 200), interface adaptor 200 again asserts a data request signal on line 242. In response to the data request signal DMA control circuit 237 generates a read pulse on line 239. In response to the read pulse a selected memory element places a data word on data bus 202. DMA control circuit 237 sends a data acknowledge signal on line 244. Word counter 216 is decremented once for each asserted data acknowledge signal. These write and read operations are repeated as often as necessary to complete the data transfer.

Memory elements are selected by sequence selection circuit 100 as follows. For purposes of illustration, it is assumed that the following memory element sequence is loaded in first in, first out order in sequence storage circuit 226: memory element 0, memory element 5, memory element 10 and memory element 12. The first identifier in sequence storage circuit 226, when accessed, causes memory element 0 to be selected. The first identifier is also written back to the input of sequence storage circuit 226 before a second identifier is accessed. When interface adaptor 200 asserts a data request on line 242 to transfer a data word to memory element 0, the first data word placed on data bus 202 is read by memory element 0, and word counter 216 is decremented by 1. In response to a second data request signal, a second data word is read by memory element 0, and word counter 216 is again decremented by 1. This continues until word counter 216 reaches 0.

When word counter 216 reaches 0 zero detector circuit 218 is activated to provide various control signals as follows: control signals are provided on lines 222 and 224 to sequence storage circuit 226 to cause the second identifer to be accessed for selecting memory element 5, and to cause the second identifier to be written back to the input of sequence storage circuit 226; and a control signal is provided to load word counter circuit 216 from holding register circuit 212.

After data is transferred to memory element 5, the process is repeated to transfer data to memory elements 10 and 12. When the transfer to memory element 12 is complete, memory element 0 will again be selected and the sequence repeated to transfer additional data to each of the selected memory elements. This process will continue until the data transfer from the interface adaptor 200 is completed. After a desired amount of data has been transferred to memory elements 0, 5, 10 and 12, a data transfer will begin from memory elements 0, 5, 10 and 12 to their corresponding device interfaces 210 to complete the data transfer to the storage devices.

FIGS. 4(a)-(f) show an example of the steps by which a typical FIFO circuit 400 selects a repeating sequence of memory elements. The FIFO is configured to select a sequence of 5 memory elements in single order from an array of 16 elements. The sequence in the order is 0, 5, 8, 14 and 2. The FIFO is implemented as 16 addresses deep (although only 5 are necessary for this example) by 4 bits wide. The addresses are encoded and a 4-to-16 decoder circuit 402 is used to select one element at a time. In FIGS. 4(a)-(f) a solid line signal path indicates that the signal path is active; a dotted line signal path indicates that the path is inactive.

Figure 4A:
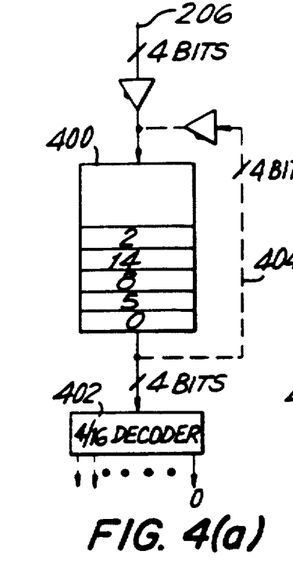
FIGS. 4(a)–(f) illustrates the sequence selection process of the present invention using a 4-bit wide, 16-element sequence storage circuit having decoded outputs for serially sequencing 5 of 16 elements.

In FIG. 4(a), microprocessor bus 206 is shown activated to load FIFO circuit 400 with addresses of the selected elements in sequence. In this figure elements 0, 5, 8, 14 and 2 are loaded in first-in first-out order. Element 0 is loaded first.

Figure 4B:
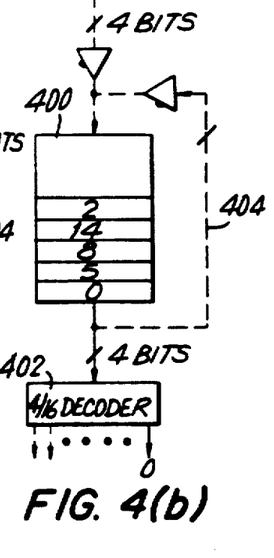

FIG. 4(b) shows the FIFO circuit 400 during data transfer with element 0 selected. Microprocessor bus 206 is inactive during this time.

Figure 4C:
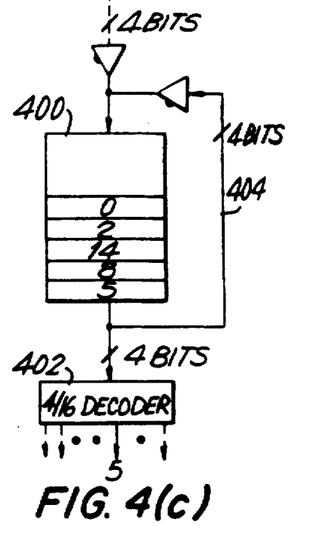

FIG. 4(c) shows the end of data transfer to element 0. The address of element 0 is written back into the FIFO circuit 400 after the FIFO circuit is accessed via write-back path 404. Element 5 is selected at this time.

Figure 4D:
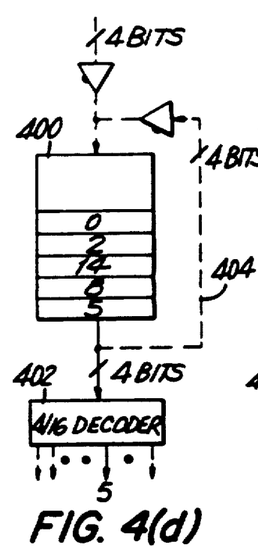

FIG. 4(d) shows FIFO circuit 400 during data transfer with element 5 selected. The write-back path 404 is inactive.

Figure 4E:
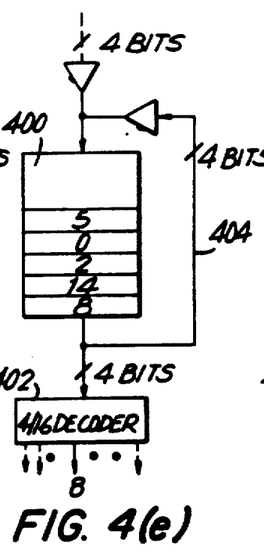

FIG. 4(e) shows the end of data transfer to element 5. The address of element 5 is written back into FIFO circuit 400 after the FIFO circuit is accessed via write back-path 404. Element 8 is selected at this time.

Figure 4F:
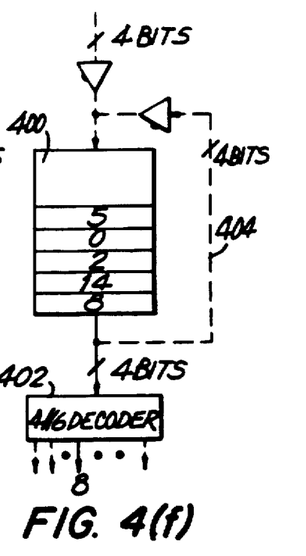
Figure 5A:
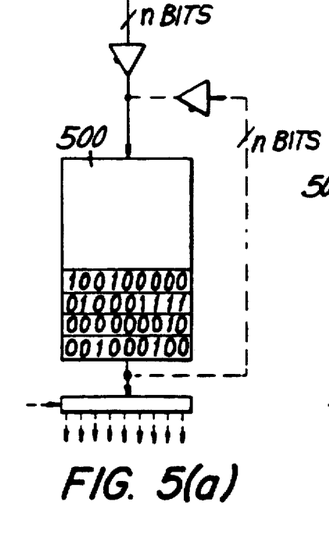
FIGS. 5(a)-5(f) illustrates another embodiment of the sequence selection process of the present invention using a 9-bit wide bit-significant sequence storage circuit for sequencing various groups of elements from a 9 element array.
Figure 5B:
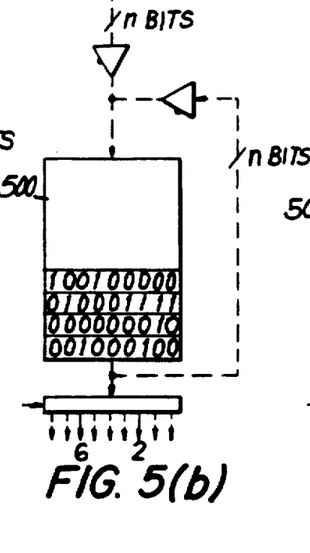
Figure 5C:
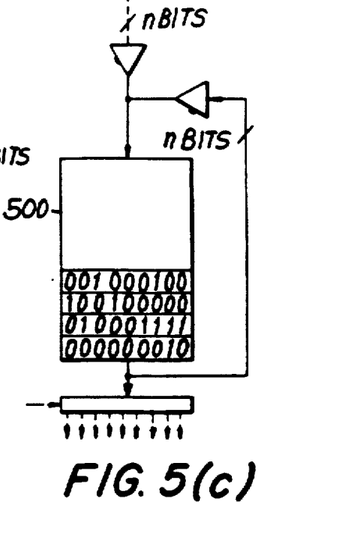
Figure 5D:
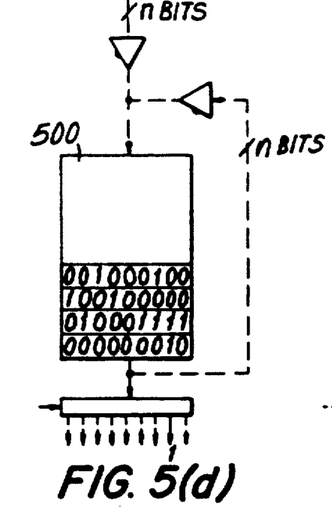
Figure 5E:
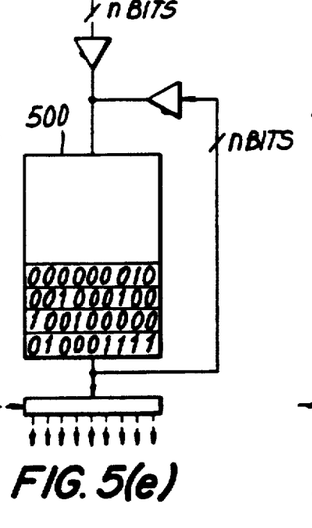
Figure 5F:
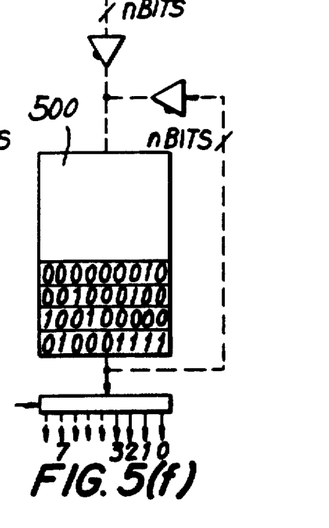

FIG. 4(f) shows FIFO circuit 400 during data transfer with element 8 selected. Write-back 404 is again inactive.

Elements 14 and 2 are accessed in the same way as the previous elements. These accesses are not shown in FIG. 4. This sequence will be repeated until the data transfer for all elements is completed as discussed previously.

FIG. 5 is an alternative implementation of a sequence storage circuit using a FIFO circuit 500 with a bit-significant format; therefore a decoder is not needed. A "1" means the bit is active to select the element when accessed. A "0" means the bit is inactive and the element is not selected when being accessed from FIFO circuit 500. As discussed above, with bit-significant selection, more than one element can be selected at the same time to store the same data. In the example of FIGS. 5(a)–(f), 9 elements are in the array and a sequence of 4 groups are stored FIFO circuit 500. The sequence of groups are loaded and selected in the same manner as discussed with respect to FIFO circuit 400 of FIG. 4.

Thus a novel circuit for selecting a variable sequence of elements has been described. One skilled in the art will appreciate that the present invention can be practiced by other than the described embodiments, and in particular may be incorporated in circuits other than the described secondary storage subsystem, and may be modified for use with other types of electronic systems. The described embodiments are presented for purposes of illustration and not of limitation, and the present invention is limited only by the claims which follow.

What is claimed is:

1. In a system including a plurality of elements each selectable to perform a task, a programmable circuit for selecting a variable sequence of elements from the plurality of elements to perform a series of tasks, the circuit comprising:
    (a) sequence storage means for storing a sequence of element identifiers, the sequence storage means having an input terminal through which element identifiers are loaded into the sequence storage means to be stored, an output terminal through which element identifiers stored in the sequence storage means are accessed, and input and output terminal control circuitry responsive respectively to input and output terminal control signals for controlling the input and output terminals;
    (b) processor means, coupled by bus and signal logic means to the input terminal and to the input terminal control circuitry of the sequence storage means to program the sequence storage means by loading a sequence of element identifiers in the sequence storage means, each of the element identifiers in the loaded sequence of element identifiers having a value;
    (c) access means, including bus and signal logic means coupled to the processor means, and to the output terminal and the output terminal control circuitry of the sequence storage means, for providing an output terminal control signal to the output terminal control circuitry to access an element identifier stored in the sequence storage means responsive to a read signal;
    (d) write-back means, including bus and signal logic means coupled to the input and output terminals of the sequence storage means, and to the input and output terminal control circuitry of the sequence storage means, for reloading an accessed element identifier from the output terminal of the sequence storage means into the input terminal of the sequence storage means responsive to a load signal;
    (e) element selection means, including signal lines coupled to the output terminal of the sequence storage means and to the plurality of elements, for selecting at least one element from the plurality of elements identified by a value of an element identifier accessed from the sequence storage means; and
    (f) read and load signal providing means, coupled by signal lines to the access means and the write-back means, for providing read and load signals respectively to the accessing means and the write-back means when a task is completed by a selected element,
    whereby upon completion of each of a series of tasks an accessed element identifier is automatically reloaded into the sequence storage means, thus providing automatic programming of the sequence storage means, and an element identifier is automatically accessed from the sequence storage means to select one or more elements from the plurality of elements to perform a successive task in the series, until the series of tasks is completed.

2. The circuit of claim 1, further comprising means for validating the value of each accessed element identifier.

3. The circuit of claim 1, further comprising means coupled to the sequence storage means for initializing the sequence storage means and the read and load signal providing means.

4. The circuit of claim 1,, wherein element identifiers are loaded into the sequence storage means in an order determined by the processor means, and element identifiers stored in the sequence storage means are accessed and reloaded in the same order in which they are loaded.

5. The circuit of claim 1, wherein the write-back means comprises a circuit for reloading an accessed element identifier in the sequence storage means before a subsequent element identifier is accessed.

6. The circuit of claim 1, wherein the sequence storage means comprises a FIFO circuit having a data input at which element identifiers are loaded into the FIFO circuit, and a data output at which the loaded element identifiers are accessed, the data output being coupled to the data input to write each accessed element identifier back to the data input.

7. A method for selecting a variable sequence of elements from a plurality of elements to perform a series of tasks, the method being accomplished by steps performed without operator intervention by programmable electronic circuitry under control of a microprocessor, comprising the steps of:
    (a) loading a plurality of element identifiers into an input terminal of a sequence storage means, the plurality of element identifiers being provided to the input terminal of the sequence storage means via bus and signal logic means controlled by a microprocessor, and the loading of the plurality of element identifiers into the sequence storage means being done in a sequence determined by status information processed by the microprocessor, each of the loaded element identifiers having a value;
    (b) providing, in automatic response to the loading of the sequence of element identifiers into the sequence storage means, the first loaded element identifier at an output terminal of the sequence storage means;

(c) selecting an element to perform a task by generating a select signal on one of a plurality of select signal paths coupled to the output terminal of the sequence storage means and to the plurality of elements, the selected element being identified by a value of an element identifier provided at the output terminal of the sequence storage means;

(d) monitoring progress of a task performed by a selected element and automatically generating read and load control signals when the monitored task is completed; and (e) in automatic response to a load signal, reloading an element identifier into the sequence storage means by writing back an element identifier from the output terminal to the input terminal of the sequence storage means, and, in automatic response to a read signal, providing at the output terminal of the sequence storage means an element identifier next in the sequence of element identifiers stored in the sequence storage means, whereby the element identifiers stored in the sequence storage means are automatically and successively accessed and recycled as necessary to select elements for completing the series of tasks to be performed.

8. The method of claim 7, further comprising the step of validating the value of each accessed element identifier.

9. The method of claim 7, further comprising the step of initializing the sequence storage means and the means for monitoring progress of a task to be performed by a selected element.

10. A programmable, variable memory element selection circuit for use in a secondary storage subsystem, the secondary storage subsystem including a data path, a plurality of selectable memory elements each coupled by bus and bus control logic means to transfer data between the data path and a corresponding one of a plurality of secondary storage devices coupled to the secondary storage subsystem, and a microprocessor coupled by bus and bus control logic means to provide control information to the programmable, variable memory element selection circuit responsive to which the programmable, variable memory element selection circuit selects a repeatable sequence of memory elements for transferring a series of data segments between the data path and a series of the plurality of secondary storage devices, the circuit comprising:

(a) programmable sequence storage means for storing a sequence of memory element identifiers, the sequence storage means having an input terminal through which element identifiers are loaded into the sequence storage means to be stored, an output terminal through which element identifiers stored in the sequence storage means are accessed, and input and output terminal control circuitry responsive respectively to input and output terminal control signals for controlling the input and output terminals;

(b) programming means, including bus and signal logic means coupled to the input terminal and input terminal control circuitry of the sequence storage means and to the microprocessor, for programming the sequence storage means with a sequence of memory element identifiers determined by control information provided by the microprocessor to the sequence storage means, each of the memory element identifiers in the programmed sequence having a value;

(c) access means, including bus and signal logic means coupled to the output terminal and output terminal control circuitry of the sequence storage means, for accessing memory element identifiers stored in the sequence storage means in the programmed sequence;

(d) write-back means, including bus and signal logic means coupled to the input and output terminals of the sequence storage means, and to the input and output terminal control circuitry of the sequence storage means, for reloading accessed element identifiers into the sequence storage means;

(e) signal path means coupled to the output terminal of the sequence storage means and to the plurality of memory elements for selecting at least one memory element from the plurality of memory elements identified by a value of a memory element identifier accessed from the sequence storage means; and (f) programmable detection means, coupled by control signal paths to the accessing means, the write-back means, and to data transfer control circuitry controlling a data transfer between the data path and the plurality of memory elements, for detecting when the data transfer is completed and for indicating to the accessing means when to access an element identifier, and to the write-back means when to reload an element identifier.

11. The circuit of claim 10, further comprising means for validating the value of each accessed memory element identifier.

12. The circuit of claim 10, further comprising means coupled to the sequence storage means for initializing the sequence storage means and the programmable detection means.

13. The circuit of claim 10, wherein the number of memory element identifiers in the programmed sequence stored in the sequence storage means is programmably variable.

14. The circuit of claim 10, wherein the write-back means comprises a circuit for reloading each accessed memory element identifier in the sequence storage means before a subsequent memory element identifier is accessed.

15. The circuit of claim 10, wherein the sequence storage means comprises a FIFO circuit having a data input at which memory element identifiers are loaded into the FIFO circuit, and a data output at which the loaded memory element identifiers are accessed, the data output being coupled to the data input to write each accessed memory element identifier back to the data input.

16. The circuit of claim 10, wherein memory element identifiers are stored in the sequence storage means in a bit significant format.

17. The circuit of claim 10, wherein memory element identifiers are stored in the sequence storage means as encoded memory element addresses, and wherein the circuit further comprises decoding means for decoding each accessed memory element identifier to select a memory element.

18. A programmable variable memory element sequence selection circuit comprising:

(a) a FIFO storage circuit having a data input and a data output;

(b) a multiplexer circuit, having an output coupled by a data bus to the data input of the FIFO storage circuit, a control terminal and first and second inputs, the first input of the multiplexer being coupled by a write-back data bus to the data output of the FIFO storage circuit, whereby data at the data output of the FIFO storage circuit is automatically communicated to the first input of the multiplexer, and is automatically loaded into the data input of the FIFO storage circuit through the multiplexer circuit unless the first input of the multiplexer is disabled by a control signal at the control terminal;

(c) a data bus coupling the second input of the multiplexer circuit to processor means, the processor means also being coupled to the control terminal of the multiplexer circuit to supply a control signal to the multiplexer to disable the first input and enable the second input of the multiplexer for loading a sequence of multiple-bit element identifiers into the FIFO circuit, each element identifier including an address value and at least one parity bit;

(d) an element selection bus coupled to the data output of the FIFO storage circuit and to a plurality of elements;

(e) a parity circuit coupled to the data output of the FIFO storage circuit, operable to check parity of an element identifier present at the data output of the FIFO storage circuit;

(f) a counter circuit having a counting input connected to receive a signal indicative of each successful transfer of a data unit to a memory element, the counter circuit generating a signal when counted successful transfers reaches a predetermined value; and (g) a detector circuit coupled to the counter circuit which detects the signal generated by the counter circuit and responsively causes an element identifier to be accessed from the FIFO circuit data output and reloaded into the data input of the FIFO circuit, the address value of the accessed element identifier defining a pattern of select element identifier signals on the element selection bus.

* * * * *

UNITED STATES PATENT AND TRADEMARK OFFICE
CERTIFICATE OF CORRECTION

PATENT NO. : 5,146,574

DATED : September 8, 1992

INVENTOR(S) : Kumar Gajjar et al.

It is certified that error appears in the above-identified patent and that said Letters Patent is hereby corrected as shown below:

On the title page, item [54] and column 1, lines 2 and 4, change "PROGRAMMABLE" to --PROGRAMMABLY-- and change "ELEMENT" to --ELEMENTS--.

Column 1, line 2, "PROGRAMMABLE" should be --PROGRAMMABLY--.

Column 1, line 4, "ELEMENT" should be --ELEMENTS--.

Column 2, line 19, after "thereof" insert --,--.

Column 2, line 65, "FIGS. 4(a)-(f)" should be --FIGS. 4(a)-4(f)--.

Column 4, line 18, after "parallel" insert --.--.

Column 8, line 17, after "0" insert --,--.

Signed and Sealed this

First Day of November, 1994

Attest:

BRUCE LEHMAN

Attesting Officer

Commissioner of Patents and Trademarks